May 28, 1968 M. J. BLES 3,385,217
HYDRAULIC PRESSURE BOOSTER
Filed Feb. 21, 1966 2 Sheets-Sheet 1
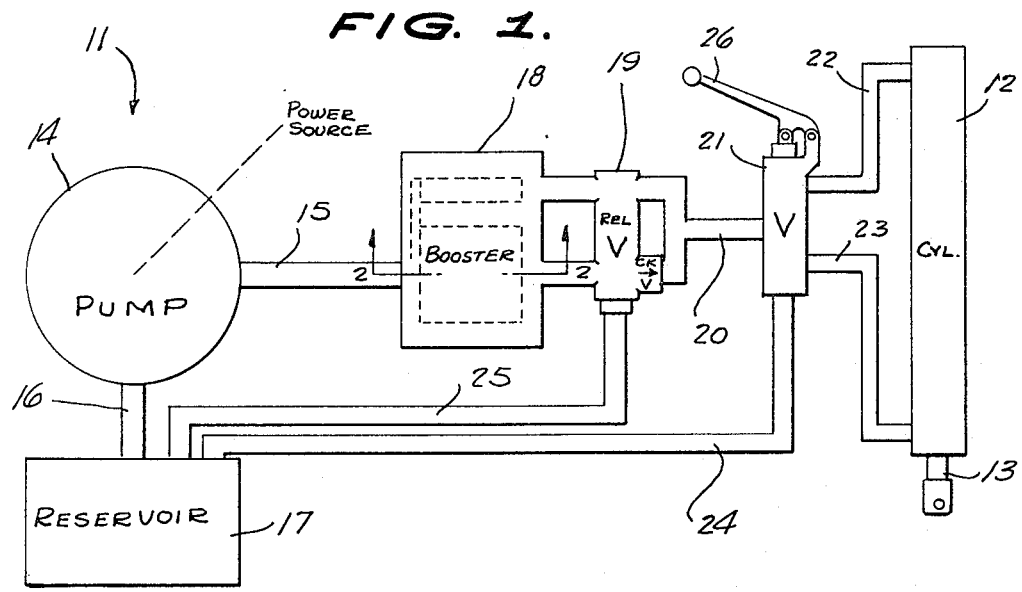
INVENTOR.
MARCUS J. BLES,
BY
Berman, Davidson & Berman
ATTORNEYS.

May 28, 1968     M. J. BLES     3,385,217
HYDRAULIC PRESSURE BOOSTER
Filed Feb. 21, 1966     2 Sheets-Sheet 2
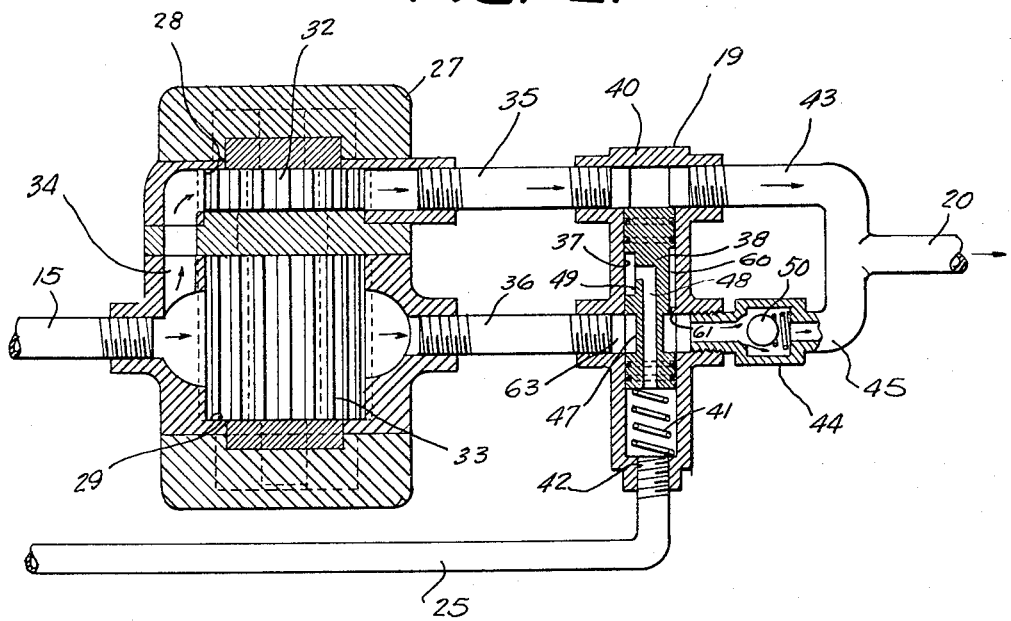
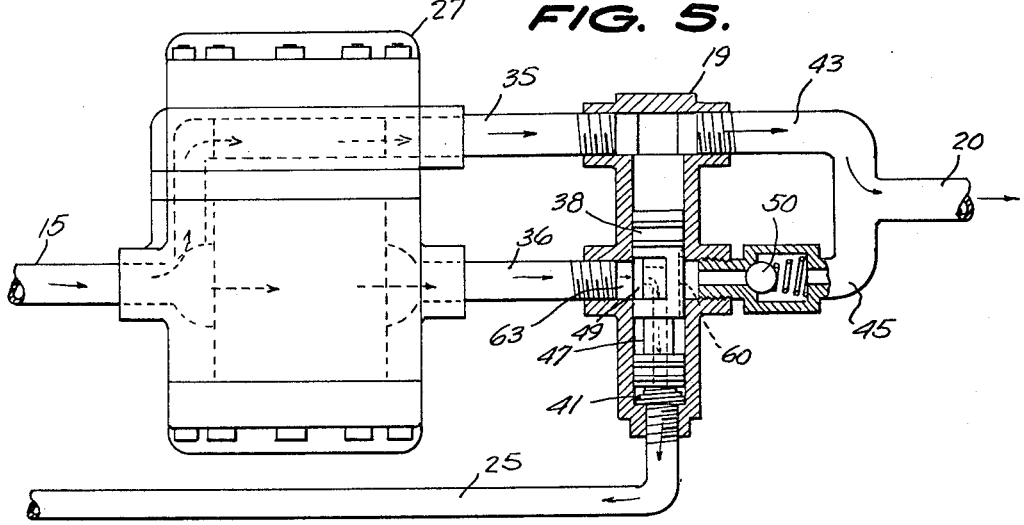
INVENTOR.
MARCUS J. BLES,
BY
Berman, Davidson & Berman
ATTORNEYS.

United States Patent Office 3,385,217
Patented May 28, 1968

3,385,217
HYDRAULIC PRESSURE BOOSTER
Marcus J. Bles, 8330 Leesburg Pike,
McLean, Va. 22101
Filed Feb. 21, 1966, Ser. No. 529,070
10 Claims. (Cl. 103—11)

This invention relates to hydraulic fluid supply and return systems for hydraulic motors and other load devices subject to varying degrees of loading, and more particularly to an improved booster arrangement in a fluid-supply system for absorbing temporary overloads or sudden increases in loading which create corresponding increases in working fluid back pressures in the system.

A main object of the invention is to provide a novel and improved hydraulic fluid supply and return system for load devices subjected to temporary heavy increases in loading, the system being relatively simple in construction, involving inexpensive components, being reliable in operation, and providing a booster action permitting a wide range of loading on the associated fluid motor device while allowing the system to operate with parts nominally rated for a relatively low normal power output.

A further object of the invention is to provide an improved fluid supply and return system for one or more load devices subjected to temporary increases in loading, the system involving relatively few parts, providing a high degree of economy in operation, and being self-adjusting to compensate for sudden increases in working fluid back pressure due to sudden heavy loads imposed on the associated motor devices, whereby stalling of said motor devices is prevented and whereby the system automatically resumes its normal-flow condition at the determination of the phases of heavy loading.

Further objects and advantages of the invention will become apparent from the following description and claims, and from the accompanying drawings, wherein:

FIGURE 1 is a schematic diagram showing an improved fluid supply and return system for a hydraulic drive cylinder, the system being constructed in accordance with the present invention.

FIGURE 2 is an enlarged cross-sectional view taken substantially on the line 2—2 of FIGURE 1.

FIGURE 3 is a longitudinal vertical cross-sectional view taken through the booster assembly employed in the system of FIGURE 1, said view being taken substantially on the line 3—3 of FIGURE 2.

FIGURE 4 is a cross-sectional view of the booster device shown in FIGURE 3, taken substantially on the line 4—4 of FIGURE 3, shown connected to other parts of the system including the associated back pressure-responsive relief valve of the system, the valve being shown in its normal condition, namely, under the conditions of normal loading, showing the relief valve shifted responsive to a substantial increase in working back fluid pressure, whereby the system is adjusted to compensate for said increase in back fluid pressure.

FIGURE 5 is a view similar to FIGURE 4, but showing the positions of the parts under overload conditions.

Referring to the drawings, and more particularly to FIGURE 1, 11 generally designates a fluid supply and return system for a hydraulic drive cylinder 12 subject to temporary increases in loading, for example, such as may occur when the device driven by the piston rod 13 of the cylinder encounters abnormal resistance. The system 11 comprises a pump 14 which may be driven from any suitable power source, such as an electric motor, internal combustion engine, or the like, the pump having the output fluid conduit 15 and the intake fluid conduit 16. The fluid conduit 16 is connected to the fluid-supply reservoir 17. The output line 15 is connected through a booster device 18 and a pressure-responsive relief valve 19 to the intake conduit 20 associated with a conventional manually-operated reversing valve 21. The valve 21 is provided with outlet conduits 22 and 23 connected to the respective ends of the motor cylinder 12. The reversing valve 21 is also provided with a return conduit 24 connected to the reservoir 17. Relief valve 19 is likewise provided with a return conduit 25 connected to said reservoir 17.

The conventional reversing valve 21 is arranged so that when its operating handle 26 is in one position, conduit 20 is communicatively-connected to conduit 22 and conduit 23 is communicatively-connected to conduit 24. This admits hydraulic fluid into the upper end of the cylinder 12, as viewed in FIGURE 1, and allows hydraulic fluid to exhaust from the lower end of said cylinder. When the lever 26 is moved to a second position, the valve 21 is reversed, causing conduit 20 to be communicatively-connected to conduit 23 and causing conduit 22 to be communicatively-connected to conduit 24, whereby the piston rod 13 of the cylinder 12 is retracted, inasmuch as hydraulic fluid under pressure is admitted into the lower end of the cylinder and the hydraulic fluid from the upper end of the cylinder is allowed to exhaust to the reservoir 17.

As will be readily apparent, should the device driven by the piston rod 13 encounter a sudden resistance, the back fluid pressure in the conduit 20 will correspondingly build up, and ordinarily, if the pump 14 has a rated power output only sufficient to maintain normal operation of the motor device 12, the pump 14 will stall since it will not be able to continue under the condition caused by the increased back pressure. In accordance with the present invention, the devices 18 and 19 and associated connections are provided to allow the system to continue in operation under these conditions of sudden heavy loading.

The booster device 18 comprises a casing 27 containing the elements of two fluid gear motors or pumps with their gears mounted on common shafts and with the motor or pump units arranged in axial alignment. Thus, the casing 27 is formed with a relatively short motor compartment 28 and a relatively long motor compartment 29 arranged in axial alignment, each motor compartment being internally-contoured in the same manner as a conventional gear pump or motor to receive a pair of meshing gears. Respective shafts 30 and 31 are journaled in the casing 27 in parallel relationship and extending axially in the respective generally circular gear cavities of the casing. A pair of relatively short gear-shaped rotors 32 are secured on the shafts 30 and 31, the gears 32 being in meshing relationship as in the case of a conventional gear pump or gear motor. Similarly, a pair of relatively long gear-shaped rotors 33, 33 are secured on the shafts 30 and 31 in meshing relationship in the motor compartment 29. The gear-shaped rotors 32 are thus provided in the motor compartment 28 whereas the substantially longer meshing gear-shaped rotors 33, 33 are provided in the motor compartment 29, as is clearly shown in FIGURE 4. The shafts 30 and 31 extend transversely through both motor compartments 28 and 29, the rotors 32 and 33 on said shafts being rigidly-coupled, and the corresponding gear-shaped rotors being in meshing engagement, as above-mentioned. Thus, the meshing long gears 33, 33 define a low-pressure, high-volume fluid motor or pump, whereas the meshing short gear-shaped rotors 32, 32 define a high-pressure, low-volume fluid motor or pump.

The supply conduit 15 is connected to the casing 27 and leads to a fluid-inlet chamber 34 communicating with both motor compartments 28 and 29 and located at one side of the respective pairs of meshing gear-shaped rotors 32, 32 and 33, 33. At the other side of casing 27 the motor compartment 28 is connected to a fluid-outlet conduit 35 and the motor compartment 29 is connected to another fluid-outlet conduit 36.

The pressure-responsive relief valve 19 comprises a casing formed with a longitudinal bore 37 containing a piston 38 having a longitudinal groove 60 which slidably-receives a lug 61 provided on the bore wall, said piston being biased upwardly, as viewed in FIGURE 4, namely, toward an end wall 40 of the casing by a coiled spring 41 disposed between the lower end of the piston 38 and the bottom wall 42 of the valve casing. Return conduit 25 is connected to the valve casing at said bottom wall 42, as shown in FIGURE 4. The top end of the valve casing is connected by a conduit 43 to the fluid conduit 20 leading to the manually-operated valve 21. The conduit 35 is connected to the top portion of the valve casing at a location opposite the conduit 43, as shown in FIGURE 4. The conduit 36 is connected to the intermediate portion of the casing of valve 19 at a port 63, and the opposite side of the valve casing is connected through a check valve 44 and another conduit 45 to the fluid-supply conduit 20 leading to the manually-operated reversing valve 21. The check valve 44 is arranged to prevent reverse flow through conduit 45 toward conduit 36 through the casing of valve 19.

The piston 38 is formed with a peripheral intermediate groove 47 which normally establishes communication between conduit 36 and the check valve 44, allowing fluid to flow therethrough to the conduit 45 and thence to the conduit 20. Piston 38 is formed with a vent passage 48 communicating with a cavity 49 which is normally blanked off when the piston is in its normal operating position, as shown in FIGURE 4, but which is movable into registry with the end of the conduit 36 when the piston is moved downwardly to the position of FIGURE 5, for example, when an abnormal increase in back fluid pressure occurs in the conduit 43. In the position of FIGURE 5, the conduit 36 is communicatively-connected to the return conduit 25, allowing the pressure fluid acting on the long meshing gear elements 33, 33 to drive said gear elements so that these long gear elements 33, 33 function as a low-pressure, high-volume fluid motor. This motor acts to drive the meshing gear-shaped rotor elements 32, 32 as a pump, so that these meshing relatively short gear elements 32, 32 function as a high-pressure, low-volume fluid pump, and generate sufficiently increased fluid pressure in conduit 35 to overcome the increased back pressure in conduit 43 developed as a result of a temporary substantial increase in loading on the device driven by the cylinder 12.

The point at which the meshing relatively long gear-shaped rotors 33, 33 begin to function as a motor is determined by the point at which the cavity 49 comes into registry with the conduit 36, and this, in turn, depends upon the strength of the spring 41. Thus, by suitably selecting the spring 41 the point of commencement of the pump action of the booster device 18 can be predetermined.

Under normal operating conditions the output fluid from pump 14 flows through conduit 15 and through the booster device 18, leaving said booster device through the conduit 35 and 36 and passing through the passages provided therefor in the valve 19 to the conduit 20, through the conduits 43 and through check valve 44 and conduit 45. The shafts 30 and 31 are free to rotate and the gears 32, 32 and 33, 33 likewise revolve as the pressure fluid moves between the meshing gear teeth thereof and flows into the conduits 35 and 36. When a substantial increase in back pressure occurs in the conduit 43, as above-described, due to a sudden overload, the build-up of pressure drives the piston 38 downwardly, as viewed in FIGURE 4, against the opposing force of spring 41, until cavity 49 is moved into registry with the conduit 36, at which point conduit 36 is vented to the reservoir 17 through the return conduit 25, so that the meshing relatively long gear-shaped rotor elements 33, 33 begin to function as a fluid motor, driving the gear segments 32, 32 as a low-volume, high-pressure pump, as above-described. This condition continues as long as there is sufficient fluid pressure acting on the piston 38 to maintain registry of cavity 49 with conduit 36. When the overload terminates, the piston 38 is moved toward its normal position, shown in FIGURE 4, wherein cavity 49 is blanked off and wherein communication is again restored between conduit 36 and the passage leading to the check valve 44. This restores normal operation of the system.

As shown in FIGURE 5, when the booster action is in effect, namely, when the substantial back pressure is present on conduit 43, causing the piston 38 to be pressed against the force of spring 41, the pressure acts on the ball 50 of the check valve 44 to cause the ball to engage its seat. Thus, check valve 44 acts to prevent reverse flow from conduit 45 toward valve 19, as above-described, isolating valve 19 from conduit 45 so as to allow proper venting of conduit 36 to the reservoir 17 through return conduit 25.

While a specific embodiment of an improved automatic booster means for a fluid supply and return system for a load device subjected to temporary substantial increases in loading has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a fluid supply and return system for a load device subject to temporary increases in working back fluid pressure due to heavy loading, a fluid-supply conduit, a pressure fluid source connected to said conduit, a fluid-return conduit, a fluid-output line adapted to be connected to the load device, and a fluid-pressure intensifier device connected between said supply conduit, fluid-output line and fluid-return conduit for increasing the supply fluid pressure delivered to said output line responsive to an increase in back pressure therein comprising a casing formed with a short motor compartment and a long motor compartment in axial alignment, parallel shaft means journaled in the casing and extending transversely through the compartments, respective meshing pairs of long and short gear rotors mounted on said shaft means in said compartments, the meshing long gear rotors defining a low-pressure, high-volume fluid motor or pump and the meshing short gear rotors defining a high-pressure, low-volume fluid motor or pump, means connecting one side of said compartments to the fluid-supply conduit, means normally connecting the other side of said compartments to said output line, and means to connect the long motor compartment to the return line and simultaneously disconnect it from the output line responsive to a substantial increase in working back fluid pressure in said output line, whereby the meshing pair of long gear rotors are operated as a motor to drive the meshing short gear rotors acting as a pump to generate high-fluid pressure to compensate for the increase in working back fluid pressure.

2. The fluid supply and return system of claim 1, and wherein said motor compartments are generally circular in shape and have substantially the same diameters, and wherein said long and short gear rotors correspondingly have substantially the same diameters.

3. The fluid supply and return system of claim 1, and wherein said last-named means comprises a relief valve connected across the motor compartments and having movable piston means normally connecting said long motor compartment to the output line and normally also connecting the short motor compartment to said output line, said piston means being movable responsive to said increase in working back fluid pressure and being provided with means to connect said long motor compartment to the return line responsive to movement of said piston means.

4. The fluid supply and return system of claim 3, and conduit means including a check valve connecting the output line to said relief valve, said piston means being formed to normally connect said last-named conduit means to the long motor compartment.

5. The fluid supply and return system of claim 4, and spring means in the relief valve urging said piston means toward a normal position wherein said last-named conduit means is communicatively-connected to said long motor compartment.

6. The fluid supply and return system of claim 5, and wherein said relief valve includes an end space connected to said fluid-return conduit and said piston means is provided with a side cavity and formed with a passage connecting said side cavity to an end of the piston means exposed to said end space, said valve having a port communicatively-connected to the long motor compartment, said side cavity being registrable with said port responsive to said movement of the piston means.

7. The fluid supply and return system of claim 6, and wherein said piston means has an annular groove normally communicatively-connecting said port to said last-named conduit means.

8. The fluid supply and return system of claim 7, and wherein said pressure-fluid source has an output pressure which is relatively low as compared with the working back fluid pressure required to compress said spring means.

9. The fluid supply and return system of claim 7, and wherein said relief valve includes an elongated casing, said piston means being non-rotatably and slidably-disposed in said casing, said port being located at the intermediate portion of said casing.

10. The fluid supply and return system of claim 7, and wherein said spring means comprises a coiled spring mounted in said end space substantially coaxially with and bearing against the end of said piston means.

References Cited

UNITED STATES PATENTS

| | | | |
|---|---|---|---|
| 2,550,405 | 4/1951 | Crosby | 103—11 |
| 2,567,997 | 9/1951 | Granberg | 137—99 XR |

WILLIAM F. O'DEA, *Primary Examiner.*

H. W. WEAKLEY, *Examiner.*